May 25, 1965 J. J. NAGY 3,185,608

TAPE SPLICER

Filed June 18, 1962

INVENTOR

John J. Nagy

BY C. Yates Dowell I & II

ATTORNEY

United States Patent Office 3,185,608
Patented May 25, 1965

3,185,608
TAPE SPLICER
John J. Nagy, 913 Douglass Drive, McLean, Va.
Filed June 18, 1962, Ser. No. 203,219
3 Claims. (Cl. 156—506)

This invention relates to communication and more particularly to the maintenance and editing of tapes of the type used in tape recorders and the like.

Since the advent of the tape recorder its use has greatly increased not only for home and other entertainment purposes but in the broadcasting studios, and for computers and various programming devices.

It has become the practice in radio and television stations to record programs of various types, especially those having news significance, and to replay the same or excerpts therefrom at a later time. Furthermore, programs such as announcements, panel discussions, on-the-scene interviews and the like are frequently recorded on tape before being broadcast. The advantages of tape recording for later replay are many and include the possibility of editing to remove undesirable material.

Tape recording has also become widely used in computers and in the programming of automatic machinery.

In the editing of tape it is the practice to play the same and determine between what points on the tape a section to be excised is located. This is done by moving the tape across the play back head and locating the points on the tape at which the material to be excised begins and ends. Then the tape is cut at such points, the undesired tape discarded, and the ends spliced together. In the editing of the tape it may be necessary to remove a substantial number of parts or lengths thereof and resplice the ends. Unless the tape is accurately and strongly spliced, the presence of the splice may be noticeable to the hearer during play-back or the splice may give way during such play-back.

Furthermore, in the use of tape there is sometimes an inadvertent break, necessitating a splice.

Heretofore, various splicing devices have been provided. However, these have been either relatively complex, time consuming and lacking precision or else they have demanded a high degree of manual skill, in addition to requiring an unreasonable time.

Accordingly, it is an object of the present invention to provide a relatively simple tape splicing device by means of which the tape may be accurately and easily cut and spliced with a minimum of skill and loss of time and by means of which the recording may be checked while in the splicer in order that accurate editing may be carried out most efficiently.

Figure 1:
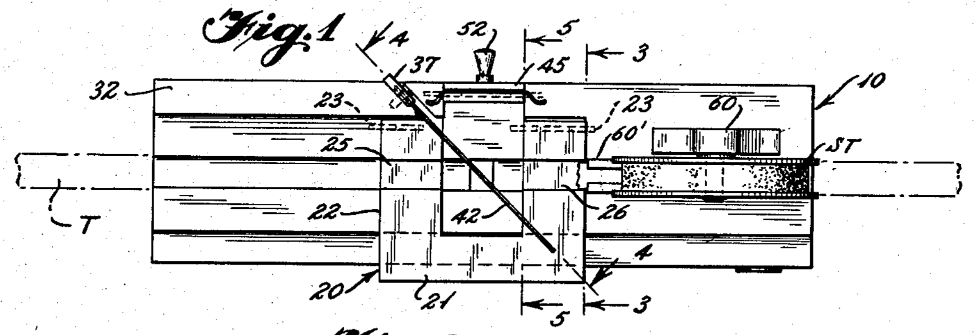
Figure 2:
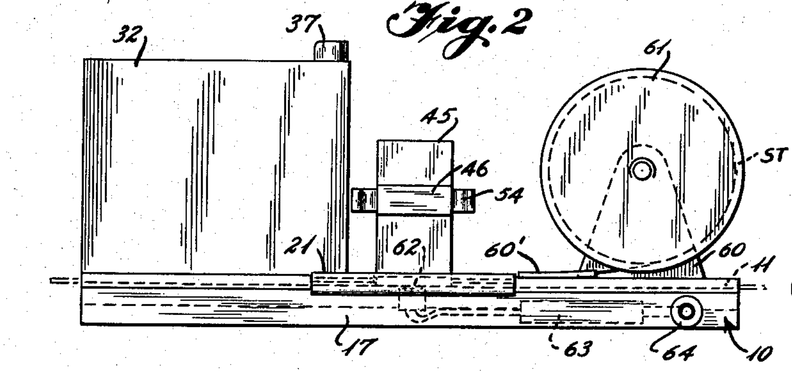
Figure 3:
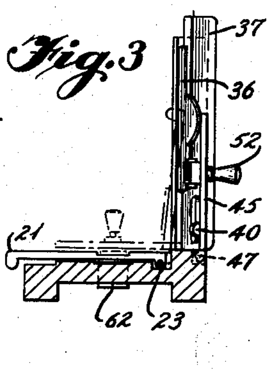
Figure 4:
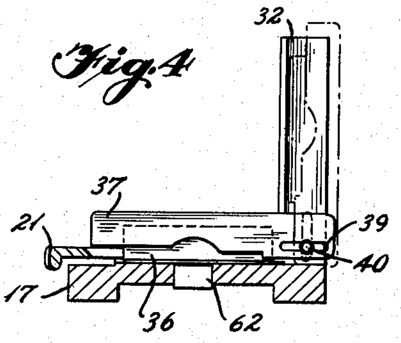
Figure 5:
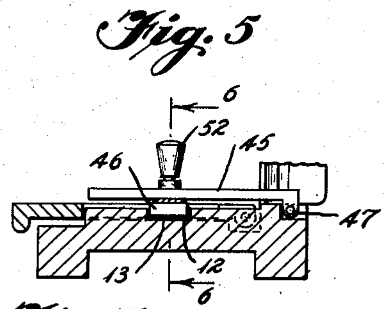
Figure 6:
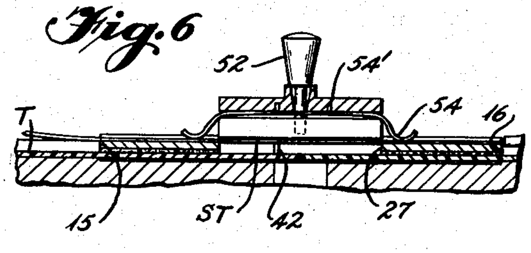
Figure 7:
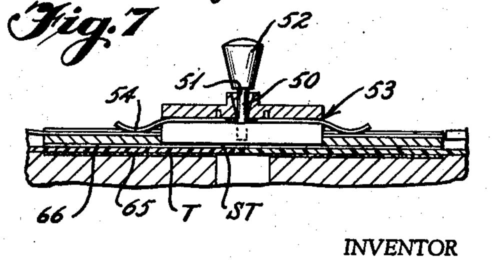

These and other objects of the invention will become apparent from the following description in conjunction with the accompanying drawing, in which FIG. 1 is a plan view of an apparatus in accordance with the present invention;

FIG. 2, a front elevation;

FIG. 3, a section on the line 3—3 of FIG. 1;

FIG. 4, a section on the line 4—4 of FIG. 1 illustrating the cutter member in two extremes of movement;

FIG. 5, a section on the line 5—5 of FIG. 1 illustrating the cutter member in two extremes of movement;

FIG. 6, an enlarged section on the line 6—6 of FIG. 5 and illustrating the position of the cutter block just prior to severing the splicing tape; and FIG. 7, a view similar to FIG. 6 illustrating the cutter block after severing the splicing tape and pressing the same into engagement with the recording tape.

Briefly stated, the present invention includes a base member having a longitudinal tape engaging and receiving groove therein, a removable hold-down bifurcated member mounted to lie across the tape positioned in the groove and having grooves transversely of the bifurcated portion for receiving splicing tape, the base having a diagonal slit for receiving the edge of a cutting member, the cutting member mounted to project into said slit for cutting tape, a tape holder, a combined punch and splicing tape positioning member, and an electronic component mounted in the base for detecting signals recorded on the tape.

With continued reference to the drawing, the device of the present invention includes an elongated base 10 having an elongated groove 11. The base may be mounted on a tape recorder adjacent to the play-back head or be separately mounted if desired.

The groove 11 is of a size to snugly receive the tape which is used and preferably has its sides 12 inclined slightly inwardly from its bottom 13 in order to tend to maintain the tape therewithin.

Approximately intermediate of the base are a pair of parallel transverse grooves 15, 16 which extend from the front face 17 of the base approximately midway thereacross. The sides of the grooves 15, 16 are vertical and the bottoms are coplanar with that of the groove 11.

Mounted for movement into and out of the grooves 15, 16 is a U-shaped member 20 having a web portion 21 and parallel arms 22, the ends of the arms 22 being mounted by pivots 23 in order that the U-shaped member may rotate from a lower position to a raised position out of the grooves.

Extending transversely across the arms 22 are slots 25, 26 of a width adapted to receive splicing tape. The inner sides 27 of the arms are vertical and form a sharp angle with the upper side.

Mounted on one corner of the base is a post 32 having a beveled portion providing a guard. Behind the guard a cutting member having a thin blade 36 and holder 37 is mounted by means of an elongated slot 39 in the holder engaged by a pin 40 in the post.

A thin vertical slit 42 extends into the base transversely across the portion intermediate the transverse grooves 15, 16 and into proximity to the cutting member.

Mounted for movement into the space intermediate the arms 22 is a support member 45 having a punch and press block 46 attached thereto. The member 45 is pivotally attached at 47 to the base.

The punch block 46 is preferably mounted on the member 45 by a pin 50 extending through a tapered opening 51 in the member 45 and having its other end connected to a handle 52 and with a U-shape leaf spring 53 secured by pins 54 intermediate the member 45 and the block 46, such arrangement permitting rocking movement of the block 46 with respect to the member 45, but tending to hold the block against the member 45. The ends 54 of the spring normally project forwardly of the block 46 for purposes which will be described.

Mounted on the base by support 60 is a reel 61 of splicing tape ST which is positioned to feed tape into the grooves of the U-shaped member.

Support 60 preferably includes a guide means 60' which positions the tape in line with the grooves 25, 26 in the U-shaped member when the latter is in the lowered position.

The splicing tape on the roll 61 is preferably wound with the adhesive side out and the feed from under the roll as indicated in FIG. 2. With the tape wound in such manner its natural curvature will cause it to tend to bow upwardly at the ends instead of at the middle as with conventionally wound tape. Hence, when the splicing tape is pressed down onto the recording tape as indicated in FIG. 7, the central part will tend to contact the recording tape before the outer ends, thereby reducing the likelihood of trapping air between the splicing and recording tapes and facilitating the making of a splice. A second advantage is that the unused end piece of the splicing tape which remains on the upper side of the member 20 within its groove 25 may be grasped more easily by its raised end than if the end were bowed downwardly.

However, the invention is not restricted to the use of tape with the adhesive on the outer surface, as either winding may be used.

Mounted in the base is electronic means responsive to a signal which may have been recorded on the tape. Such electronic means may include a pick-up head 62 mounted beneath the groove 11 intermediate the arms 22 and, if desired, a miniature amplifier 63, and signal output plug 64. By manually shifting the tape along the groove 11, the signals on its may be used to indicate, by the electronic devices described, the location on the tops of portions to be excised.

In the operation of the device for editing, the tape T is positioned appropriately to slit 42 in the groove 11 with the U-shaped member raised. Then the U-shaped member is lowered, thereby holding the tape against inadvertent movement. One or both ends of the tape or an intermediate cut may be made. After the two ends which are to be spliced have been cut by lowering the knife into the slit 42 then the ends to be spliced are brought together manually in the groove 11 and held down by the U-shaped member in the lowered position. Then a length of splicing tape is pulled off the reel and laid across the opening between the arms with portions resting in the transverse grooves of the arms. Then the member 45 is lowered, with the springlike fingers 54, 54 first engaging the splicing tape to hold it in position; then the block 46 acting like a punch enters the space between the space arms and severs the splicing tape therebetween. The member 45 is pressed downwardly against the splicing tape and rocked by the handle 52 to form a firm splice.

The bottom of the groove 11 may have a resilient padding such as cork 65 or the like in order to improve the bond between the recording tape and the splicing tape. The bottoms of the arms may have similar padding 66 or roughened to more firmly hold the recording tape during cutting and splicing.

Recording tape, especially that of professional quality, is formed from a plastic such as "Mylar," which is difficult to cut. However, by positioning the tape over the slit 42 and employing a sawing motion of the blade 36 the tape is easily and accurately cut.

If two broken ends are to be spliced together they may be overlapped in the space between the arms 22 of the U-shaped member and held in position by the latter while their ends are cut to form diagonal meeting ends. After using the cutting members 37 the operator raises it and manually removes the excess which has been cut from the upper portion of the overlapped tape ends. If such excess portion is beneath the arms of the U-shaped member it is necessary to raise it in order to remove such excess. The excess end portion may be removed by the operator without disturbing the remainder of the tape held by the channel shaped groove.

Accordingly, it will be understood that the present invention includes a base having spaced tape holding and cutting instrumentalities mounted thereon, a splicing tape supply and guide associated with the holding instrumentality for positioning the splicing tape over the tape ends to be spliced, and a combined splicing tape cutter and pressing member for applying the splicing tape to the ends of the recording tape.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A tape splicer comprising a base having a channel for snugly receiving tape and with a surface of said tape exposed, spaced arms mounted transversely of said channel and having portions which extend into the channel and engage the tape therein, said arms being movable from such tape engaging position to a position in which said portions are outside of said channel, said base having a slit which extends across the surfaces defining the channel intermediate the arms when the latter are in the tape engaging position, a thin blade cutting member mounted for movement into and out of said slit, a combined cutter and pressing member movably mounted on said base for movement from a position remote from said channel to a postion within said channel intermediate the arms when the latter are in tape-engaging position, and means for supplying splicing tape to a position along said channel and upon the arms when the latter are in tape-engaging position and spaced above the tape in said channel whereby said cutting and pressing member may be moved to engage siad splicing tape and detach a length therefrom intermediate said arms and press said cut length into engagement with tape ends lying in said channel intermediate said arms.

2. A tape splicer comprising a base having a shallow channel of a width snugly to receive tape and with a surface of said tape exposed, spaced arms pivotally mounted on said base and swingable from a position contiguous to said channel to a raised position away from said channel, said base having a slit which extends across the surface defining the channel intermediate the arms when the latter are in a position contiguous to the channel, a thin blade cutting member mounted for movement into and out of said slit, a central member pivotally mounted for movement from a position contiguous to said channel to a raised position remote therefrom, said central member cooperating with the inner sides of said spaced arms to form a punch and die when the member is moved into position between said spaced arms, and means for mounting splicing tape for unreeling in the direction of and into said channel, whereby recording tape may be snugly received in said channel, overlapping portions cut by said blade, the excess manually removed, the spaced arms lowered into position contiguous to said channel, splicing tape laid across the tops of said arms with its central portion received in the channel onto the exposed surface of the ends of the recording tape to be connected, the central member lowered between the arms, thereby shearing the central portion of the splicing tape betwen the arms, and thus completing the splice.

3. A tape splicer comprising a base having a shallow channel of a width snugly to receive tape and with a surface of said tape exposed, an arm pivotally mounted on said base and swingable from a position contiguous to said channel to a raised position away from said channel, said base having a slit which extends across the surface defining the channel adjacent to the arm when the latter is in a position contiguous to the channel, a blade cutting member mounted for movement into and out of said slit, a central member pivotally mounted for movement from a position contiguous to said channel to a raised position remote therefrom, said central member cooperating with the inner side of said arm to form a punch and die when the central member is moved into position adjacent to said arm, and means for mounting splicing tape for unreeling longitudinally in the direction of and into said channel, whereby recording tape may be snugly received in said channel, overlapping portions cut by said blade, the excess manually removed, the arm lowered into position contiguous to said channel, splicing tape laid across the top of said arm with a portion received in the channel onto the exposed surface of the ends of the recording tape to be connected, the central member lowered adjacent to the arm, thereby shearing the splicing tape adjacent to the arm, and thus completing the splice.

References Cited by the Examiner

UNITED STATES PATENTS

| | | | |
|---|---|---|---|
| 2,789,620 | 4/57 | Vano | 156—506 |
| 2,794,489 | 6/57 | Drummond | 156—505 |

EARL M. BERGERT, *Primary Examiner.*